Sept. 30, 1958  A. W. KAISER ET AL  2,854,027
DISPOSABLE-TYPE THREE-WAY VALVE CONSTRUCTION
Filed Dec. 20, 1956
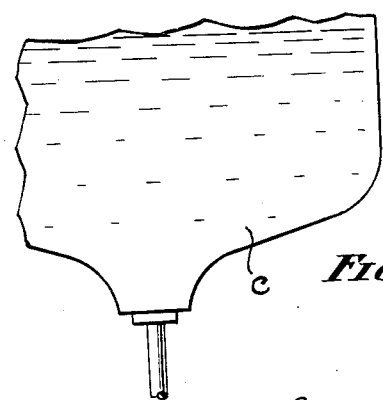
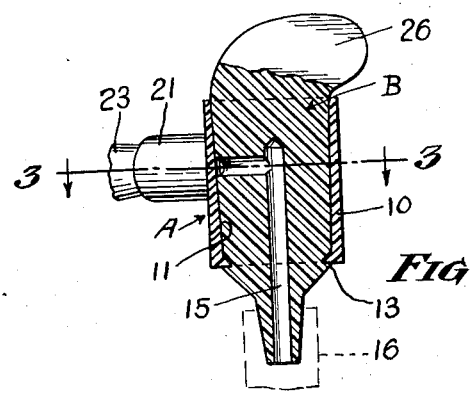
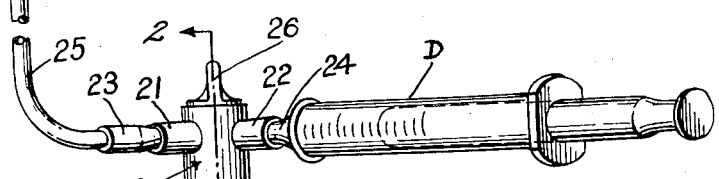
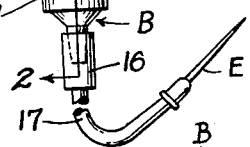
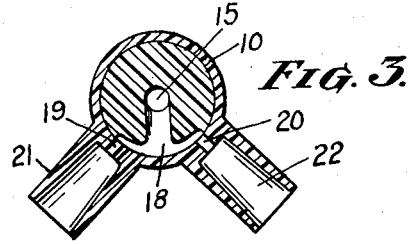
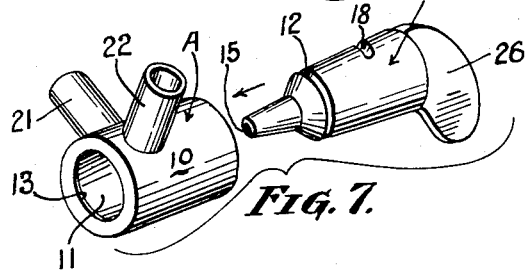
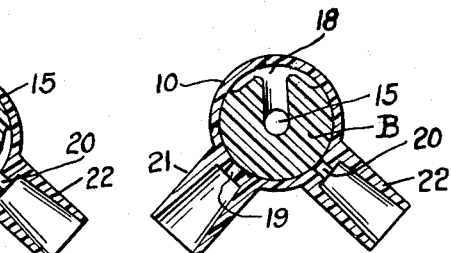
INVENTORS
Gerald K. Wood &
A. W. Kaiser
BY W. S. Rambo
ATTORNEY 2,854,027
Patented Sept. 30, 1958

2,854,027
DISPOSABLE-TYPE THREE-WAY VALVE CONSTRUCTION

Albert W. Kaiser and Gerald K. Wood, Columbus, Ohio

Application December 20, 1956, Serial No. 629,645

3 Claims. (Cl. 137—625.41)

This invention relates to a stop-cock valve structure particularly for, but without limitation to, use in the controlled administration of fluid medicinal agents and the like, such as intravenous solutions and/or anesthetics from one or more sources of supply to a hypodermic needle.

One prime object of the invention is to provide such a valve as may be manufactured so inexpensively that it is economically feasible to discard and replace it after a single or minimum period of use, thus eliminating the practice of and loss of time incidental to the re-sterilizing required for further use.

Another important aim is to provide such a valve as may be cast from suitable synthetic resin materials of such nature that they may be operatively interfitted or joined against leakage through resilient or snap action by movement of one part axially with respect to another.

Further an object is to provide such a valve complete with a minimum of two synthetic resin parts one of which is preferably more elastic than the other to facilitate said snap assembly, preferably including portions or connections whereby the valve may be single or multi-way and interconnected with means of liquid supply and a hypodermic needle.

Additional objects and advantages will in part be pointed out hereinafter and otherwise become apparent from a consideration of the accompanying drawing illustrating one operative embodiment which is to be taken in connection with the description following.

In said drawing:

Fig. 1 is an elevational view of the novel valve construction operatively connected to control the flow of a medicinal agent such as an intravenous solution and/or an anesthetic to a hypodermic needle from a flask or bottle and a hypodermic syringe connected with the valve;

Fig. 2 is a longitudinal vertical sectional view taken on the plane of line 2—2 of Fig. 1;

Fig. 3 is a horizontal sectional view taken along the plane of line 3—3 of Fig. 2 with the plug open to both inlets;

Figs. 4 through 6, inclusive, are horizontal sectional views taken on the same plane as Fig. 3 but showing the various positions the valve plug may assume with respect to the ports; and Fig. 7 is an exploded perspective view showing the two component half parts of the valve structure detached from one another.

Referring specifically to the drawing wherein like reference characters designate like or corresponding parts throughout the different views, the valve structure is shown as comprising two initially separate parts, namely, a casing or body A and a plug or stem B. Casing A for the major part is a tube 10 having its inner surface 11 coincident with the periphery of a downwardly pointed cone. Plug B is snugly and rotatably seated in said tube having a periphery conforming to the periphery of said cone. It will be noted that the plug has an annular groove 12 in its periphery interfitted with an annular flange 13 projecting inwardly from the surface 11 of the casing.

Said plug B is preferably a casting of suitable synthetic resin material and casing A is also preferably a casting of suitable synthetic resin material. Both parts A and B may be slightly elastic. The valve structure is assembled by sliding the plug B downwardly and axially into the tube 10. Through such downward movement the casing A and plug B resiliently move relatively to one another so that they will attach one to the other at the groove 12 and flange 13 by snap action. Accidental detachment of such parts A and B is prevented by the joint thus made. The joint functions secondly to prevent leakage at the valve seat. Attention is called to the fact that the synthetic resin material of casing A is preferably more elastic than the synthetic resin material of plug B so that the casing may be slightly expanded or stretched to snugly receive the cooperatively tapered plug member B and thereby to assume a fluid tight, yet rotatable seal therebetween.

As shown, a use for the valve structure is to control the flow of one or more medicinal agents such as, for example, an intravenous solution from a flask, bottle or other conventional source of supply C and/or an anesthetic from a hypodermic syringe or other conventional source of supply D to a conventional hypodermic needle E.

Such plug B has a central vertical outlet passage 15 open at its lower end which is exteriorly frusto-conical for detachable connection friction tight thereto of a socket 16 of the flexible hose or conduit 17 of the hypodermic needle E.

A lateral passageway 18 in the plug B communicates with said outlet passage 15, being open at the periphery of plug B so as to communicate with either or both radial ports 19 and 20 provided through the wall of tube 10. It will be noted that exterior radial sleeves or sockets 21 and 22, located at any preferred angle or location, are cast integral with plug B at tube 10 about ports 19 and 20, respectively, in which are detachably connected friction tight, the plugs 23 and 24, respectively, located on the outlet hose or conduit 25 leading from the source of medicinal agent at C and the hypodermic syringe at D. Other suitable means may be employed in lieu of the sleeves or sockets 21 to connect the sources of supply C and/or D to the valve.

Turning of the plug B is facilitated through the provision of a wing or finger piece 26 at its upper end.

In the use of the synthetic plastic valve in the set-up shown, the plug in the position of Fig. 6 will close the ports 19 and 20 while in the position of Fig. 3 liquid will flow from source C through port 19 and from source D through port 20 into passages 18 and 15 into the needle E. With the valve in the position of Fig. 4, port 19 will be open while port 20 is closed and, hence, only material from source C can flow to the needle, while with the valve as in Fig. 5, only material from the hypodermic syringe D can flow because port 19 will be closed and port 20 open. Being formed of synthetic resin or plastic materials, the valve is resistant to shock and breakage.

It is to be emphasized that because of the present invention, the valve structure may be so expeditiously and inexpensively made that it is practical and economically feasible to discard and replace it with another after a single operation or a minimum period of use and thus to eliminate the practice and loss of time incidental to the procedure of resterilizing as required for reuse.

Various changes may be resorted to within the spirit and scope of the invention.

What is claimed is:

1. A multi-way stop cock-type valve consisting of only two relatively interfitting and rotatable parts, said parts comprising, respectively, an outer tubular casing formed with an internal, axially tapering, plug-receiving chamber of generally circular cross-section opening at opposite ends of said casing, said casing being formed with a plurality of inlet ports communicating with the chamber of said casing intermediate the ends thereof and spaced circumferentially of said chamber one from the other, said casing being formed adjacent the smaller end of said tapering chamber with an inwardly projecting, annular and resiliently flexible flange; and a rotatable plug body of generally cylindrical cross-section extending through the chamber of said casing and formed intermediate the ends thereof with an axially tapering peripheral surface snugly and rotatably engaging the walls of said casing defining said chamber, said plug body, adjacent one end of its axially tapering peripheral surface, being formed with an annular groove occupied by the resiliently flexible flange of said casing, said flange and groove serving to maintain said plug body against accidental axial movement within the chamber of said casing while permitting relative rotation between said casing and said plug body, said plug body being further formed with inter-communicating radial and axial passage means said axial passage means forming an outlet port disposed beyond one end of said casing, the radial passage means of said plug body being disposed in the plane of the inlet ports of said casing and being arranged upon selective rotation of said plug body to connect either one or a plurality of said inlet ports with the axial passage means and outlet port of said plug body or to close said inlet ports.

2. A multi-way stop cock-type valve as defined in claim 1, wherein each of said casing and plug members is of slightly elastic, synthetic resinous composition.

3. A multi-way stop cock-type valve as defined in claim 2, wherein the synthetic resinous composition of said casing is slightly more elastic than that of said plug body.

References Cited in the file of this patent

UNITED STATES PATENTS

| | | |
|---|---|---|
| 865,406 | Linker | Sept. 10, 1907 |
| 867,780 | Auchu | Oct. 8, 1907 |
| 1,478,688 | Whidden | Dec. 25, 1923 |
| 1,710,540 | Hollander | Apr. 23, 1929 |
| 1,961,490 | Hein | June 5, 1934 |
| 2,261,213 | Bierman | Nov. 4, 1941 |
| 2,343,584 | Scheele | Mar. 7, 1944 |
| 2,731,925 | Carvel | Jan. 24, 1956 |